Dec. 25, 1928.

E. P. WEBSTER 1,696,465

MEANS FOR DRIVING ENDLESS CONVEYERS

Filed Oct. 18, 1923    6 Sheets-Sheet 1

Dec. 25, 1928.  
E. P. WEBSTER  
1,696,465  
MEANS FOR DRIVING ENDLESS CONVEYERS  
Filed Oct. 18, 1923 6 Sheets-Sheet 2

Dec. 25, 1928.　　　　　　　　　　　　　　　　　1,696,465
E. P. WEBSTER
MEANS FOR DRIVING ENDLESS CONVEYERS
Filed Oct. 18, 1923　　　6 Sheets-Sheet 5

INVENTOR
E. P. Webster
BY
E. W. Anderson
ATTORNEY

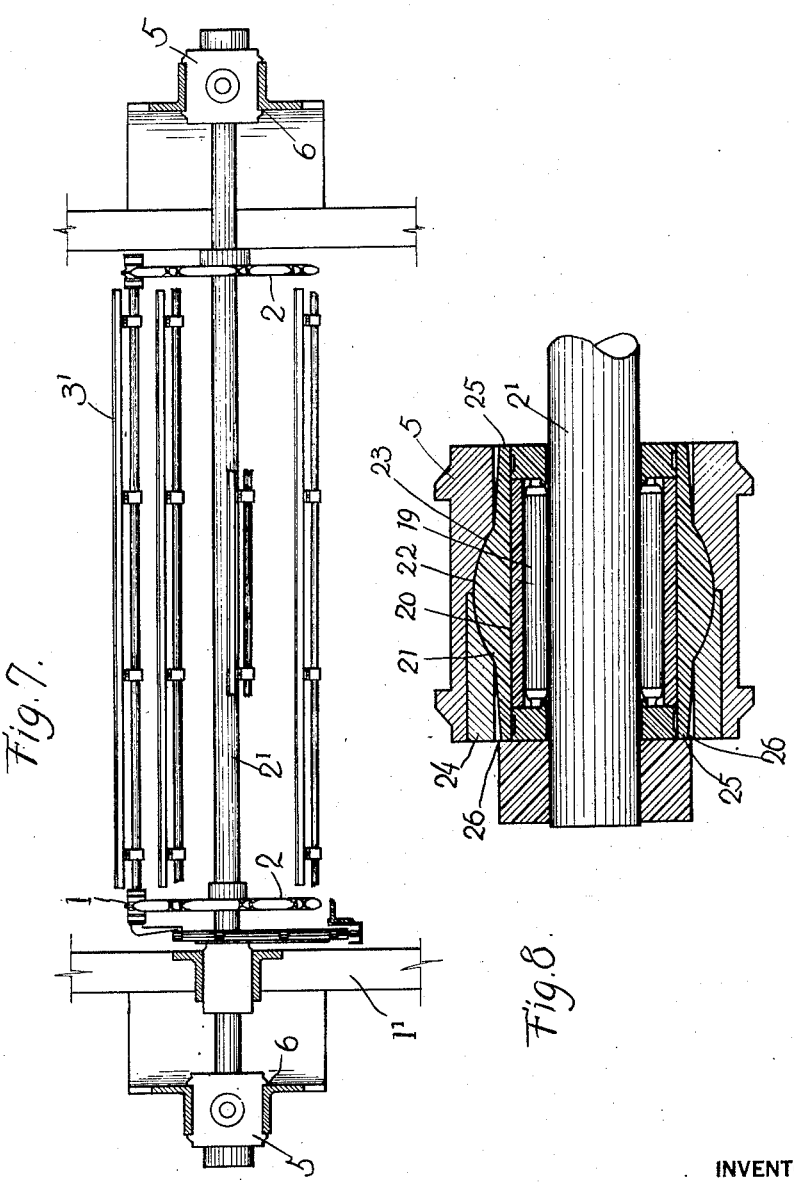

Patented Dec. 25, 1928.

1,696,465

UNITED STATES PATENT OFFICE.

EARL P. WEBSTER, OF NIAGARA FALLS, NEW YORK, ASSIGNOR TO THE SHREDDED WHEAT COMPANY, OF NIAGARA FALLS, NEW YORK, A CORPORATION OF NEW YORK.

MEANS FOR DRIVING ENDLESS CONVEYERS.

Application filed October 18, 1923. Serial No. 669,394.

This invention relates to conveying devices and is concerned more particularly with a conveying apparatus which is of particular utility in the manufacture of food products which are baked by being carried on a conveyer through an enclosed oven chamber maintained at a high temperature.

The conveyer of the present invention has been constructed primarily for use in the manufacture of shredded wheat biscuits and it includes a plurality of pans or trays mounted between a pair of endless chains. These pans receive the unbaked biscuits and carry them through the oven wherein the products are first subjected to a high temperature for baking purposes and then passed through a zone of somewhat lower temperature, so that they may be freed from moisture released during the baking operation. The oven chamber through which these biscuits are carried is of considerable length and the conveyer passes through the chamber in a plurality of horizontal stretches. The conveyer consequently is of extreme length and it is subjected to varying temperatures at different points in its travel, so that provision must be made to take care of the non-uniform expansion of the conveyer and maintain it taut. The apparatus of the present invention consequently includes driving means for the stretches of the conveyer which are disposed within the oven chamber, means for taking up slack in the conveyer chains, the said means being arranged to operate independently of one another, and also means for driving and taking up slack in that portion of the conveyer which lies outside the oven and which receives the raw biscuits and also delivers the baked biscuits to the point where a suitable removal mechanism is provided.

For a better understanding of the invention reference will be made to the accompanying drawings, in which,—

Figure 7 is a detail end view partly in section showing the journal boxes.

Figure 8 is a detail central vertical section of one of the journal boxes.

Figure 1:
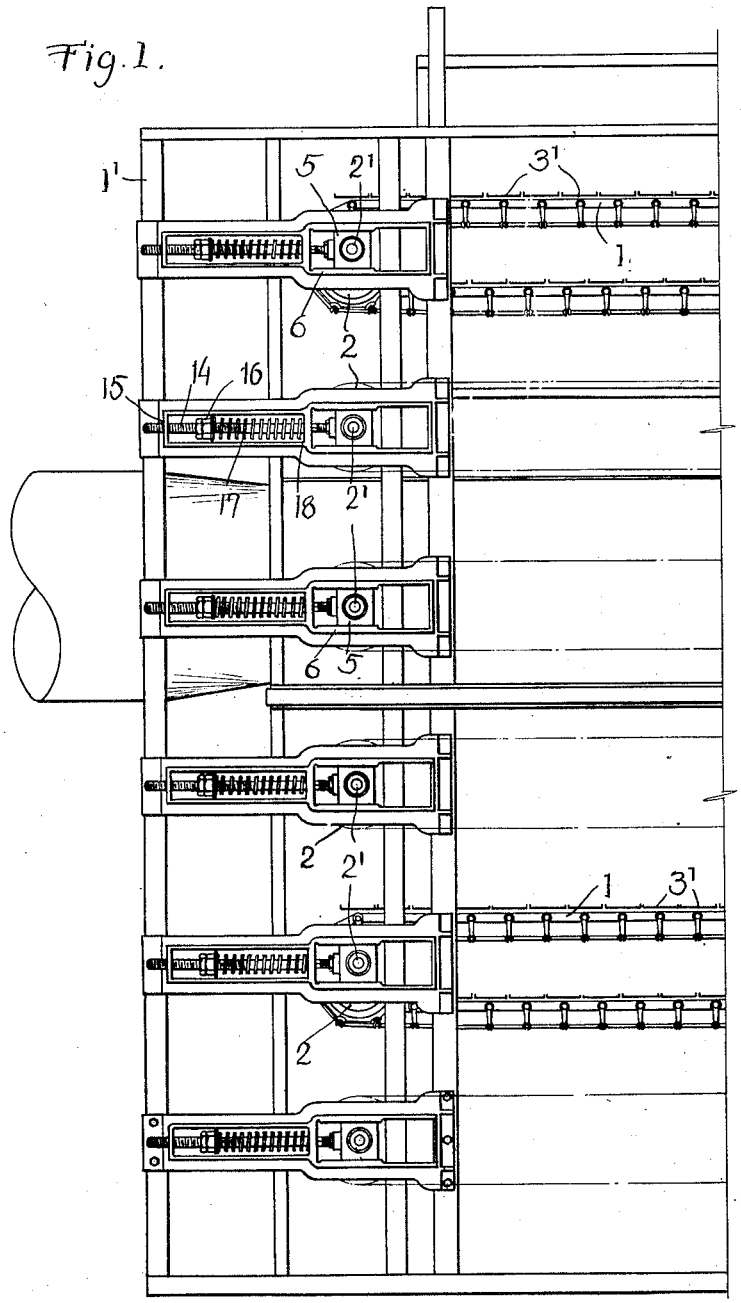
Figure 1 is a side view of one end of the oven, showing the drive means.
Figure 2:
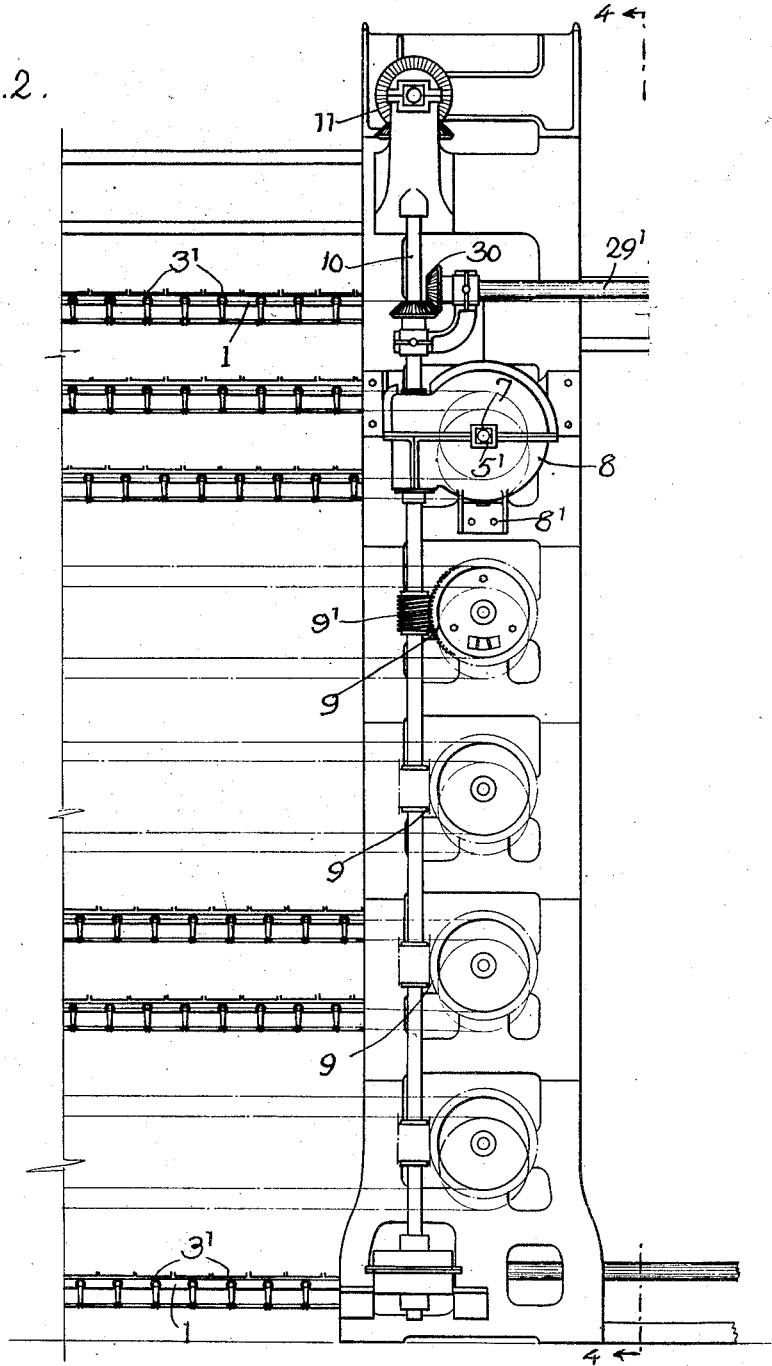
Figure 2 is a similar view of the other end of the oven.
Figure 3:
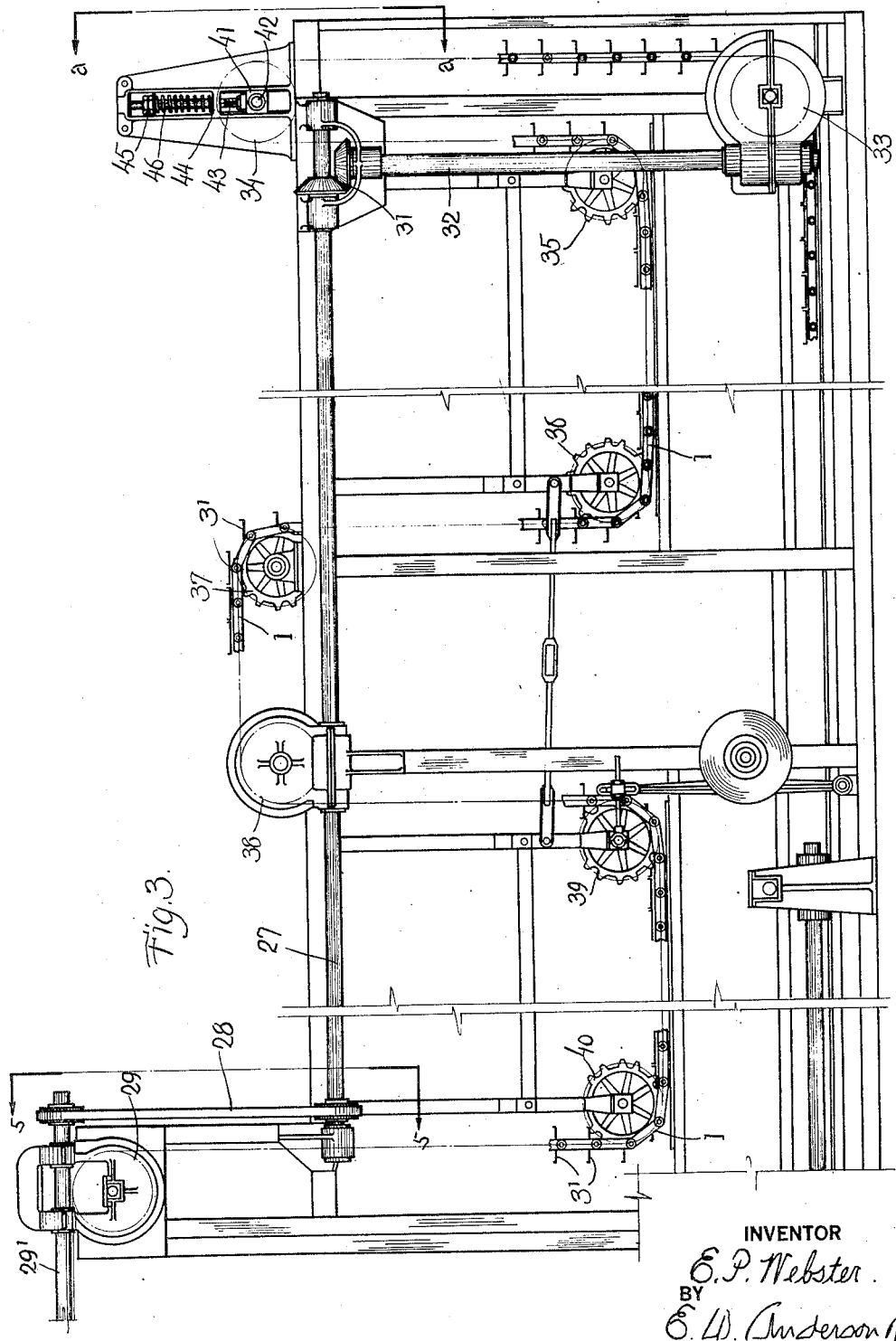
Figure 3 is a side view of the portion of the endless conveyer located without the oven, and the drive means.

In the accompanying drawings illustrating an embodiment of the invention, the numeral 1' (Fig. 1) designates the frame of the oven; 1 the conveyer chain having the transverse biscuit trays 3'; 2 the sprocket wheels for said chain; 5 the journal boxes at one end of the conveyer wherein the shafts of the sprocket wheels at said end have bearings; 5' (Fig. 2) designates the journal boxes for the shafts carrying the sprocket wheels at the other end of the conveyer, and 6 the horizontal framing tracks wherein the first named boxes are movable to adjust the tension of the conveyer chain.

Figure 4:
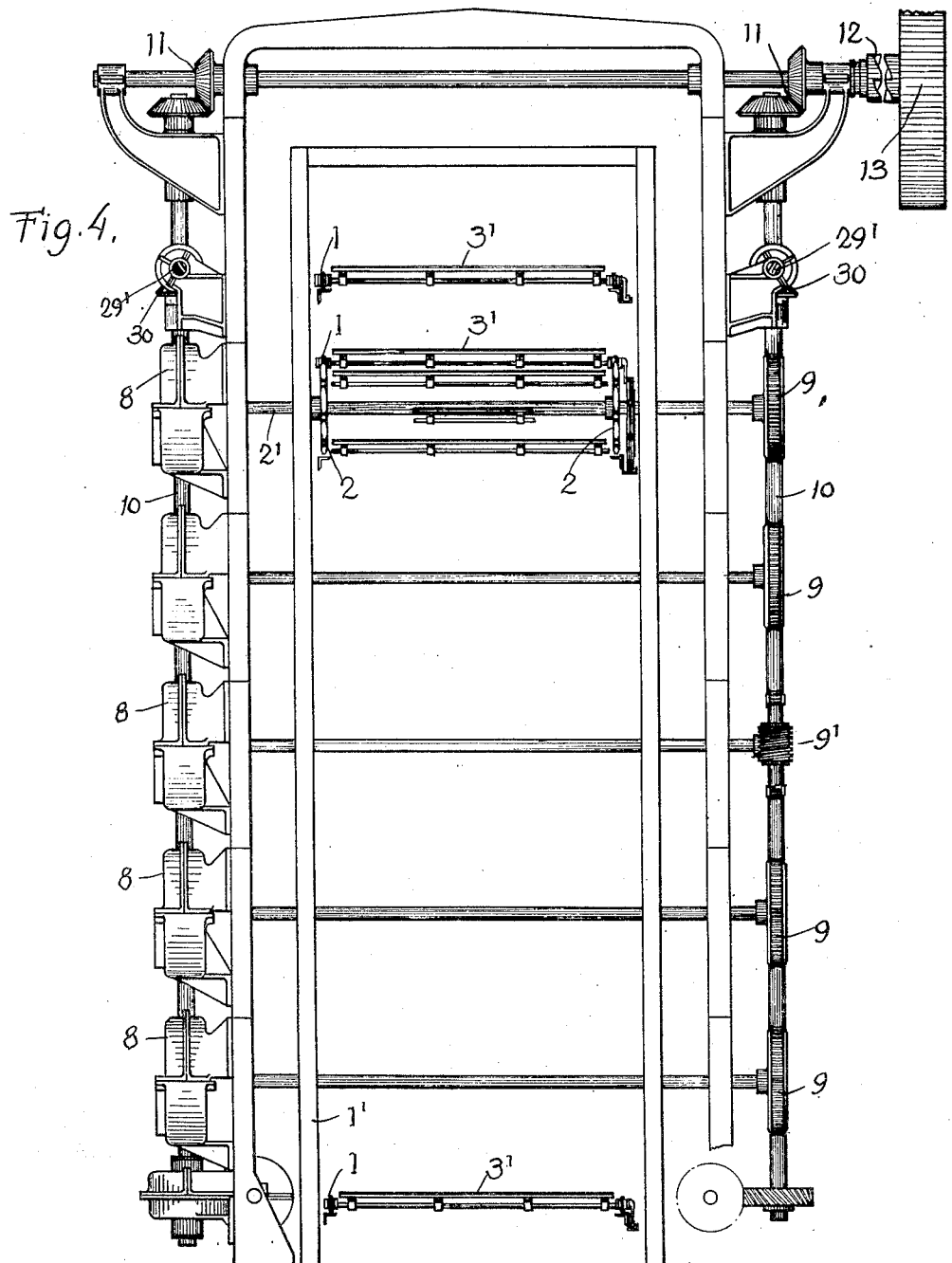
Figure 4 is a section on the line 4—4, Figure 2.
Figure 5:
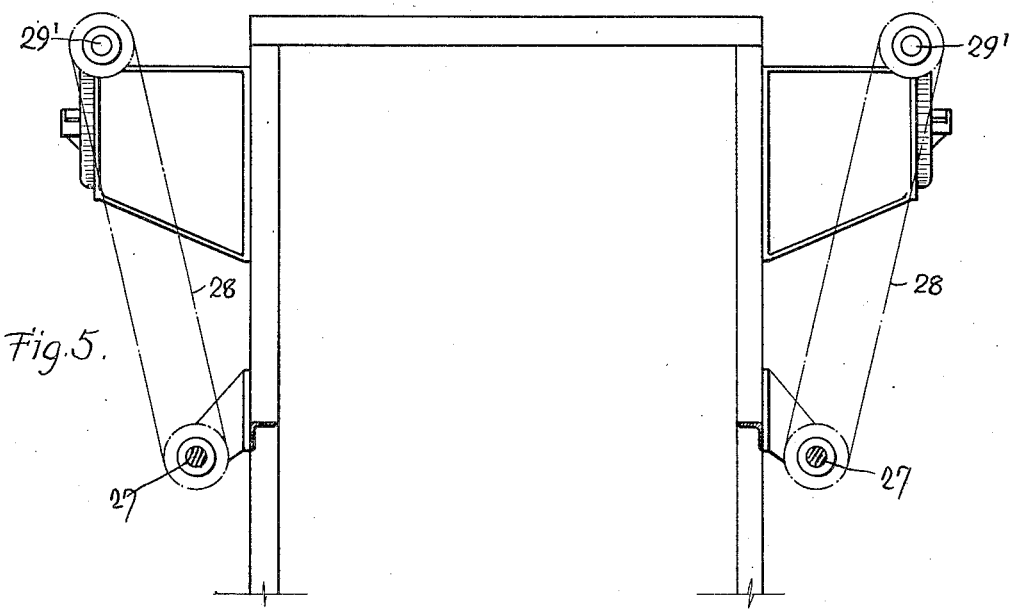
Figure 5 is a detail section on the line 5—5, Figure 3.
Figure 6:
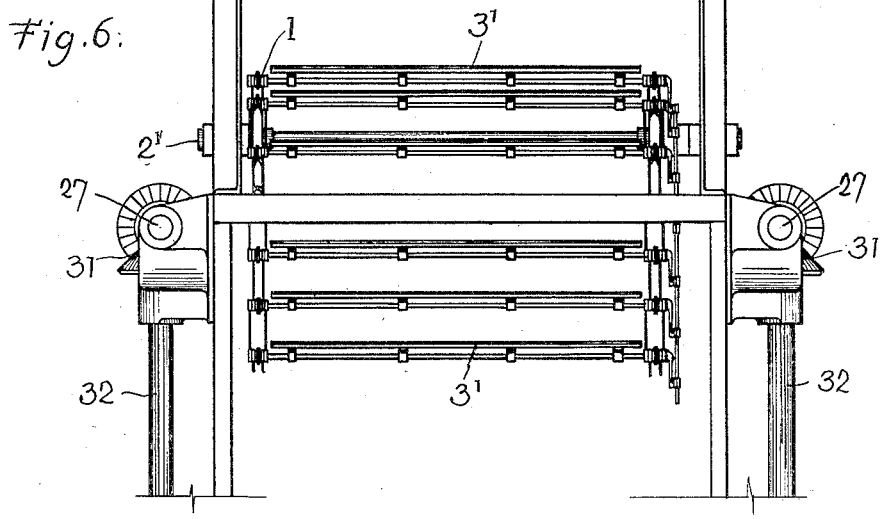
Figure 6 is a detail end view as bracketed at a—a, Figure 3.

The journal boxes 5' at the drive end of the oven and conveyer are held stationary in seats 7 of housings 8 for worm gearing 9, driving the shafts 2' of said sprocket wheels, the worms 9' of said gearing being fast upon a vertical shaft 10, which is provided at its upper end with bevel gearing 11, connecting through clutch 12 (Fig. 4), with the main drive shaft 13. The housings 8 are bolted to the framing at 8'.

The journal boxes 5 are engaged by tension adjusting screws 14, engaging perforations 15 of the framing, and each of the screws has threaded thereon a nut 16, a coiled spring 17 surrounding said screw and bearing at one end against said nut and at its other end against the framing at 18, whereby the boxes 5 have tension constantly exerted thereon by the springs 17, to take up any slack in the several stretches of the conveyer chain.

The sprocket wheels 2 at this end of the conveyer are idlers, the drive of the conveyer being from the first named end thereof as stated. The sprocket wheels 2 at both ends of the conveyer, as well as the aforesaid drive and tension adjusting means are duplicated at each side of the conveyer and for each double horizontal stretch thereof to insure a balanced action.

In the conveyer chain employed in this case the great length of the chain will vary to an appreciable degree owing to temperature changes and consequent expansion and contraction, and the tension adjusting means stated will take care of this, but there will be also for the same reason and for the further reason of unequal pull of the tension adjusting means, an appreciable comparative variation in length of the two sides of the conveyer chain, tending to pull the shafts 2′ out of their normal right angular relation to the sides of said chain.

To automatically take care of this and prevent any bind in the working parts, the journal boxes 5 of the idler sprockets at the end of the conveyer opposite the drive end, are each provided with an annular series of roller bearings 19 (Fig. 8), working in a steel shell 20, inclosed in a steel retainer or case 21, having an external rounded or part-spherical enlargement 22, working in a similarly formed socket 23, of the aforesaid box 5, said socket being partly formed in a removable member 24. This retainer or case has tapered ends 25, annularly spaced at 26 from the opposite walls of the box 5 and of the removable member, thereby allowing a limited amount of play of the shafts 2 out of right angular relation to the sides of the conveyer chain and of the bearing boxes 5.

Outside the oven the conveyer is led through two depending loops and in one of these loops is disposed the mechanism for depositing the raw or uncooked biscuits (not illustrated) on the pans, while the mechanism (not shown) for removing the baked biscuits from the pans is disposed in the other loop. The drive mechanism for this portion of the conveyer is as follows: The lower stretch of the conveyer passing horizontally out from the oven passes around sprocket wheels 33 on a horizontal shaft driven by worm gearing from shafts 32 connected by bevel gears 31 to horizontal shafts 27. The shafts 27 are driven by a belt connection 28 from a horizontal shaft 29′ which has a bevel gear connection 30 with the vertical shaft 10. The shaft 29′, by worm gearing, drives sprocket wheels 29 on a horizontal shaft near the upper part of the oven.

The conveyer passing out from the oven moves in a horizontal line to the sprocket wheels 33, then passes around these sprocket wheels and upwardly in a vertical stretch and over sprocket wheels 34 on a shaft 42. This shaft is mounted in bearing blocks 41 which are engaged by tension-adjusting screws 43 passing through perforations in the framing 44. Each screw carries a nut 45 and a spring 46 encircles the screw and bears at one end against the nut and at the other against the framing so as to place tension constantly on the journal boxes 41. Each of the journal boxes has an annular series of ball bearings in a shell, as has previously been described in connection with the disclosure of Fig. 8. These journal boxes are therefore slidable vertically and are also self-aligning.

Passing over the sprocket wheels 34, the conveyer chains descend in a vertical loop and pass around idler sprocket wheels 35 on a horizontal shaft and then around idler sprocket wheels 36 on another horizontal shaft and upwardly around sprocket wheels 37 on a horizontal shaft at the top of the loop. From the sprocket wheels 37, the chains pass over similar sprocket wheels 38 on a horizontal shaft driven by suitable worm gearing from the shaft 27 and then the chains pass successively around sprocket wheels 39 and 40 on horizontal shafts and then upwardly around the sprocket wheels 29 and into the oven. As illustrated, the horizontal shafts on which sprocket wheels 35, 36, 39 and 40 are mounted are supported on arms depending from suitable framing and this arrangement provides two vertical loops of the conveyer chain, and mechanism may be provided for depositing uncooked biscuits on the pans in one horizontal stretch of the conveyer at the end of one of these loops, while the mechanism for removing the baked biscuits may be placed in the other loop to remove biscuits from the pans in the horizontal stretch thereof.

With the arrangement as illustrated it will be observed that each horizontal stretch of the conveyer in the oven is driven by sprocket wheels on a fixed shaft and in the end of each horizontal loop of the conveyer are sprocket wheels mounted on another horizontal shaft which is slidable in horizontal ways. The sprocket wheels on the sliding shafts are idlers and each shaft is provided with self-aligning bearings so that in the event that the two chains in a stretch expand unequally, the shaft may assume a position under the influence of the tension springs to compensate for any variation in expansion of the two chains. Similarly, outside the oven the vertical loops of the conveyer are driven by fixed driving sprocket wheels but shaft 41 carrying the idler sprocket wheels 34 is movable to take up slack in this portion of the conveyer and by reason of the use of self-aligning bearings for the shaft 41, the shaft may assume a slightly canted position, thus maintaining tension on the chains even though the chains expand or contract unequally.

I claim:—

1. In conveying apparatus, the combination of a plurality of horizontal shafts disposed in a vertical row, each shaft carrying a sprocket wheel near each end thereof, a fixed bearing for each end of each shaft, a vertical drive shaft disposed adjacent the said row and provided with a driving connection with each shaft in the row, a second vertical row of horizontal shafts at a distance from the first row, each shaft in this row carrying a sprocket wheel near each end thereof, a bearing block at each end of each shaft in the second row mounted to slide horizontally, springs holding the bearing blocks in position, a self-aligning bearing for the end of the shaft mounted in each bearing block, and an endless conveyer comprising a pair of chains, this conveyer passing around the sprocket wheels in the two rows successively to provide a plurality of horizontal loops.

2. In conveying apparatus, the combination of a plurality of horizontal shafts disposed in a vertical row, each shaft carrying a sprocket wheel near each end thereof, a fixed bearing for each end of each shaft, a vertical shaft disposed adjacent the said row and provided with a driving connection with each shaft in the row, a second vertical row of horizontal shafts at a distance from the first row, each shaft in this row carrying a sprocket wheel near each end thereof, a bearing block at each end of each shaft in the second row mounted to slide horizontally, springs holding the said bearing blocks in position, a self-aligning bearing for the end of the shaft mounted in each bearing block, a horizontal shaft disposed at a distance from the row of shafts provided with fixed bearings, the said horizontal shaft being provided with vertically slidable bearing blocks, each containing a self-aligning bearing for the shaft, sprocket wheels on the said horizontal shaft, a plurality of relatively fixed horizontal shafts carrying sprocket wheels disposed between the said movable horizontal shaft and the said vertical row of horizontal shafts with fixed bearings, and an endless conveyer comprising a pair of chains, this conveyer passing around the sprocket wheels on the shafts of the two rows successively to provide a plurality of horizontal loops and also passing around the sprocket wheels on the vertically slidable horizontal shaft and the sprocket wheels on the relatively fixed shaft to provide a vertical loop.

In testimony whereof I affix my signature.

EARL P. WEBSTER.